United States Patent Office 3,525,722
Patented Aug. 25, 1970

3,525,722
MODIFICATION OF RUBBERY POLYMERS OF CONJUGATED DIENES WITH TERTIARY DODECYL MERCAPTAN
John E. Burleigh and Carl A. Uraneck, Bartlesville, Okla., assignors to Phillips Petroleum Company, a corporation of Delaware
No Drawing. Filed Dec. 18, 1967, Ser. No. 691,251
Int. Cl. C08d 5/02, 27/07, 3/14
U.S. Cl. 260—85.1                                       8 Claims

ABSTRACT OF THE DISCLOSURE

Rubbery polymers of conjugated dienes are modified by contacting the polymer with a mercaptan formed by reacting triisobutylene with hydrogen sulfide. The contacting is carried out under conditions to effect a reaction of from about 0.05 to about 0.75 percent of the double bonds in said polymer with said mercaptan.

---

This invention relates to a method for modifying rubbery polymers of conjugated dienes. In another aspect it relates to a process for modifying rubbery polymers of conjugated dienes to produce polymer products having better heat buildup properties, as well as good milling properties.

Various methods have been suggested to react synthetic rubber with mercaptans to produce soft or viscous liquid polymer products. Such products have utility as rubber plasticizers and the like.

According to our invention, a rubbery polymer of a conjugated diene is contacted with a tertiary dodecyl mercaptan that has been prepared by the reaction of hydrogen sulfide with triisobutylene. We have discovered that if the reaction is carried out under conditions such that from about 0.05 to about 0.75 percent of the double bonds in the polymer are reacted with the mercaptan, the resulting polymer product is a solid rubbery product that has a Mooney value substantially the same as the base polymer. The polymer product exhibits very good processing characteristics and it has been found that vulcanizates of the polymer have significantly lower heat buildup values than those of the untreated polymers.

Accordingly, it is an object of our invention to provide a new and improved method for modifying rubbery polymers of conjugated dienes. Another object of our invention is to provide a method for modifying rubbery polymers of conjugated dienes to improve the processing characteristics of the polymers. Still another object of our invention is to provide an improved method for modifying rubbery polymers of conjugated dienes so as to produce polymer products that have significantly lower heat buildup values when vulcanized. Yet another object of our invention is to provide a method for modifying rubbery polymers of conjugated dienes so as to produce products having higher modulus and higher resilience values when vulcanized.

The rubbery polymers that can be modified in accordance with our invention can be any rubbery polymer prepared by polymerizing conjugated dienes. Thus, the rubbery polymers that are treated in accordance with our invention, can be either homopolymers or copolymers of conjugated dienes or copolymers of conjugated dienes with various monomers such as monovinyl substituted aromatic compounds. When copolymers are treated in accordance with our invention, they can be either random copolymers or block copolymers, wherein various repeating monomer units are present in the polymer macromolecule.

In general, the conjugated diene polymers treated according to our invention will be polymers of conjugated dienes containing from 4 to 12 carbon atoms per molecule. Preferably, the conjugated dienes will contain from 4 to 8 carbon atoms per molecule. Examples of these conjugated diene monomers include the following: 1,3-butadiene, isoprene, 2,3-dimethyl-1,3-butadiene, 1,3-pentadiene (piperylene), 3-methyl-1,3-pentadiene, 1,3-heptadiene, 3-butyl-1,3-octadiene, phenyl-1,3-butadiene, and the like. Conjugated dienes containing halogen and alkoxy substituents along the chain can also be employed, such as chloroprene, fluoroprene, 2-methoxy-1,3-butadiene, 2-ethoxy-3-ethyl-1,3-butadiene, and 2-ethoxy-3-methyl-1,3-hexadiene.

The monovinyl substituted aroamtic compounds that can be copolymerized with the above mentioned conjugated dienes to produce base polymers that are treated in accordance with our invention include styrene, 1-vinylnaphthalene, 2-vinylnaphthalene, and alkyl, cycloalkyl, aryl, alkaryl, aralkyl, alkoxy, aryloxy, and dialkyl amino derivatives thereof in which the total number of carbon atoms in the combined substituents was no greater than 12. Examples of these aromatic monomers include: 3-methylstyrene (3-vinyltoluene), 4-n-propylstyrene, 4-dodecylstyrene, 4-cyclohexylstyrene, 2-ethyl-4-benzylstyrene, 4-p-tolylstyrene, 4-(4-phenyl-n-butyl)styrene, 4-methoxystyrene, 3,5-diphenoxystyrene, 4-dimethylaminostyrene, 4-methoxy-2-di-n-propylaminostyrene, 4,5-dimethyl-1-vinyl naphthalene, 8-phenyl-1-vinylnaphthalene, 4-methoxy-1-vinylnaphthalene, 3,6 - bis - (dimethylamino)-1-vinylnaphthalene, and the like.

The treatment of the polymer of conjugated diene with the tertiary dodecyl mercaptan, prepared by the reaction of hydrogen sulfide with triisobutylene, can be carried out by any convenient means for contacting materials known in the art. The treatment can conveniently be conducted by contacting the rubbery polymer with the mercaptan while the polymer is dissolved in a solvent or while it is in a latex.

When the rubbery polymer is prepared in an emulsion polymerization system, it is convenient to add the mercaptan to the latex after the removal of any unreacted monomers that may remain in the polymerization system. In such a treating process, the latex is first shortstopped, to inactivate the polymerization catalyst, followed by the addition of the mercaptan.

Instead of treating the rubber in the latex form, it can be recovered and thereafter dissolved in a suitable solvent followed by the mercaptan treatment of the rubber while it is dissolved in the solvent. When the rubber is prepared in a solution polymerization system, it is preferred to shortstop the reaction mixture to inactivate the polymerization catalyst or initiator and thereafter treat the rubber with the mercaptan, while the rubber is dissolved in the solvent.

It is not necessary that the rubber be treated with the tertiary dodecyl mercaptan, prepared from triisobutylene and hydrogen sulfide, immediately after the polymerization of the rubber. Therefore, it is another embodiment of our invention to treat rubbery polymers of conjugated dienes with the tertiary dodecyl mercaptan at any time prior to the processing or compounding of the rubbers. When rubbery polymers of conjugated dienes are treated after the polymer has been recovered from the polymerization system, it is necessary to either prepare a latex from these polymers or to dissolve the polymers in a suitable solvent to effect the desired contact between the tertiary dodecyl mercaptan and the rubbery polymer. The mercaptan treatment of the rubbery polymers is preferably carried out in the absence of oxygen.

The treatment of the rubbery polymers with the tertiary dodecyl mercaptan is preferably carried out in the presence of a promoter. While the presence of the promoter is preferred for the mercaptan treatment, it is not necessary in all instances. Any convenient source of free radicals can be utilized as a promoter. Among the promoters that can be utilized in our invention are diazothioethers such as those disclosed in U.S. Pat. 2,501,692, diazothioethers in combination with ferrous cyanides of alkali metals and ammonium such as disclosed in U.S. 2,625,537 and organic hydroperoxides such as disclosed in U.S. 2,609,362. The preferred promoters utilized in our invention are diazothioethers; azo-bis-alkylnitriles; alkali metal persulfates, such as potassium persulfate; organic peroxides, such as benzoyl peroxide; aralkylhydroperoxides; combinations of potassium persulfate or a peroxide of potassium with reduced ferric phosphate; mixtures of hydrogen peroxide and iron; mixtures of aralkylhydroperoxides and iron; and compositions containing a transition metal ion with a variable oxidation state. When such a promoter is utilized in our invention, it will be normally employed in an amount up to about 5.0 weight percent based on the polymer to be treated.

When the treatment of the rubbery polymer of conjugated diene with the tertiary dodecyl mercaptan is carried out in a solution of the rubber in a solvent, any inert solvent can be used. Suitable solvents include liquid hydrocarbons which can be paraffins, cycloparaffins, aromatic compounds, or polar compounds. Mixtures of various solvents can be used. Examples of suitable solvents include propane, isobutane, n-pentane, isooctane, n-dodecane, cyclopentane, cyclohexane, benzene, toluene, xylene, naphthalene, tetrahydrofuran and the like.

To achieve the desired modification of the rubbery polymers of the conjugated dienes it is necessary to contact the rubbery polymer with the tertiary dodecyl mercaptan under conditions such that from about 0.05 to 0.75 percent of the double bonds in the rubbery polymers are reacted with the mercaptan. Preferably, from 0.1 to 0.6 percent of the double bonds in the rubbery polymer are reacted with the tertiary dodecyl mercaptan prepared from triisobutylene and hydrogen sulfide. The double bonds that are reacted with the tertiary dodecyl mercaptan are the double bonds appearing in the conjugated diene units within the polymer.

The temperature for the treament of the rubbery polymer of the conjugated diene with the tertiary dodecyl mercaptan will generally be in the range of from about 10 to 150° C. Preferably, the temperature will be in the range of from about 30 to about 100° C. The reaction time will depend upon the temperature and will generally be within the range of from about 1 hour to about 150 hours. In some instances, it may be desirable to carry out the reaction for a longer period of time.

The tertiary dodecyl mercaptan can be prepared by reacting triisobutylene with hydrogen sulfide in any method known in the art. One suitable method for carrying out the preparation of the tertiary dodecyl mercaptan is disclosed in Industrial and Engineering Chemistry, vol 40, No. 12, pp. 2308-2313 (1948).

The rubbery polymers resulting from the treatment of the polymer of a conjugated diene with the tertiary dodecyl mercaptan find many different utilities. The polymer products can be utilized in the automobile industry for the production of various articles such as hoses, gasket materials, tires and the like. Because of the low heat build-up values of the polymer products, they are particularly useful in the production of automobile and truck tires.

A more comprehensive understanding of the invention can be obtained by referring to the following illustrated examples which are not intended, however, to be unduly limitative of the invention.

EXAMPLE I

Polybutadiene was reacted with small quantities of two different tertiary dodecyl mercaptans, one prepared by reacting hydrogen sulfide with triisobutylene and the other prepared by reacting hydrogen sulfide with propylene tetramer, in order to demonstrate the difference in rubber properties obtained with each of the reactants. The recipe was as follows:

| | Parts by weight |
|---|---|
| Polybutadiene [1] | 100 |
| Cyclohexane | 750 |
| Tertiary dodecyl mercaptan | 3 |
| Azoisobutyronitrile | 2 |

[1] Prepared by polymerizing 1,3-butadiene in the presence of 0.1 weight percent of divinylbenzene using n-butyllithium as the catalyst and n-hexane as the diluent. The polymer had a raw Mooney (ML-4 at 212° F.) of 35.

In each run one part of the azoisobutyronitrile was added initially and the second part after 93 hours. The temperature was maintained at 70° C. and the mixture was agitated throughout the reaction period. Each reaction was shortstopped after 126.2 hours with one phr. (part by weight per 100 parts by weight rubber) of di-tert-butylhydroquinone dissolved in a mixture of methyl alcohol and benzene and 1.5 phr. of the antioxidant, tris-nonylphenyl phosphite in order to maintain the antioxidant level in the polymers at approximately 1.5 phr. The polymer treated with mercaptan from triisobutylene (run 1) is hereinafter designated as Polymer A and that treated with mercaptan from propylene tetramer (run 2) is hereinafter designated as Polymer B.

Prior to shortstopping, a 1-milliliter sample was withdrawn from each reaction mixture and analysis, based on mercaptan disappearance, was made to determine the amount of mercaptan that had reacted with the polymer. The sample was added to a mixture of 100 milliliters of tetrahydrofuran and 9 ml. toluene. Two milliliters of water was added followed by two milliliters of methanol and two milliliters of ammonium nitrate solution (prepared by dissolving 30 grams of ammonium nitrate in 100 milliliters of concentrated ammonium hydroxide). The mixture was titrated amperometrically with a 0.005 N silver nitrate solution (prepared by diluting 50 milliliters of 0.1 N aqueous silver nitrate solution to one liter with methyl alcohol). Results were as follows:

| | Mercaptan added, phr. | Double Bonds in polymer reacted, percent |
|---|---|---|
| Run No.: | | |
| 1 | 0.5 | 0.135 |
| 2 | 1.0 | 0.27 |

The mercaptan-treated products were compounded and cured and properties of the vulcanizates were determined. Data are presented in the following table:

| | Polymer A | Polymer B |
|---|---|---|
| Compounding recipe, parts by weight: | | |
| Polymer | 100 | 100 |
| Intermediate super abrasion furnace black | 70 | 70 |
| Zinc oxide | 3 | 3 |
| Stearic acid | 3 | 3 |
| Wingstay 100 [1] | 1 | 1 |
| Santoflex AW [2] | 2 | 2 |
| Paraffin wax | 2 | 2 |
| Aromatic oil (Philrich 5) | 40 | 40 |
| Sulfur | 2 | 2 |
| NOBS special [3] | 1.2 | 1.2 |
| Raw ML-4 at 212° F | 100 | 120 |
| Compounded ML-4 at 212° F | 78 | 94 |
| Cured 30 minutes at 307° F.: | | |
| Compression set, percent | 36.9 | 41.7 |
| 300% modulus, p.s.i | 750 | 700 |
| Tensile, p.s.i. (80° F.) | 1,330 | 1,190 |
| Elongation, percent | 420 | 410 |
| Tensile at 200° F. p.s.i.[4] | 750 | 495 |
| ΔT., °F | 88.0 | 117.5 |
| Resilience, percent | 59.8 | 57.2 |
| Shore A hardness | 50 | 49 |

[1] Mixture of diaryl-p-phenylenediamines.
[2] Condensation product of p-phenetidine and acetone.
[3] N-oxydiethylene-2-benzothiazolesulfenamide.
[4] 45-minute cure.

These data show that in run 1, made according to the invention, only 0.135 double bonds in the polymer reacted with mercaptan whereas twice as many double bonds reacted with mercaptan in run 2, yet the Polymer A vulcanizate had a significantly higher tensile at 200° F. and a much lower heat buildup than Polymer B vulcanizate. Other properties of Polymer A vulcanizate were as good as or better than those of Polymer B vulcanizate.

EXAMPLE II

Tertiary dodecyl mercaptan prepared by reacting hydrogen sulfide with triisobutylene was added to a butadiene/styrene rubber latex which had been vented and stripped free of unreacted butadiene and styrene. The reaction was conducted in the presence of 1.0 phr. potassium persulfate at 50° C. After 23.6 hours, 1.6 phr. of mercaptan had combined with the polymer, based on mercaptan disappearance. This represented about 0.44 percent reaction of the double bonds in the rubber. The reaction was terminated with 0.75 phr. di-tert-butylhydroquinone. The latex was stabilized with 2 phr. phenyl-beta-naphthylamine and the polymer was coagulated by the salt-acid technique, separated, and dried. Polymer from a portion of the latex which had not been treated with mercaptan was recovered in a manner similar to that employed for the treated polymer. The butadiene/styrene rubber employed was prepared by emulsion polymerization at 41° F. using a mixture of fatty acid soaps and rosin acid soaps as the emulsifier according to the recipe and procedures set out in ASTM D-1419-61T. The mercaptan prepared by reacting triisobutylene and hydrogen sulfide was used as the modifier.

The base polymer and the polymer treated with mercaptan were compounded and cured and properties of the vulcanizates were determined. Data are presented in the following table:

| | Mercaptan-treated polymer | Base polymer |
|---|---|---|
| Compounding recipe, parts by weight: | | |
| Polymer | 100 | 100 |
| High abrasion furnace black | 50 | 50 |
| Zinc oxide | 3 | 3 |
| Stearic acid | 5 | 5 |
| Flexamine [1] | 1 | 1 |
| Aromatic oil (Philrich 5) | 10 | 10 |
| Sulfur | 1.75 | 1.75 |
| Santocure [2] | 1.2 | 1.2 |
| Raw ML-4 at 212° F | 58 | 46 |
| Compounded ML-4 at 212° F | 46.5 | 44.5 |
| Cured 30 minutes at 307° F.: | | |
| $v \times 10$, mols/cc | 2.30 | 1.75 |
| 300% modulus, p.s.i. (80° F.) | 2,420 | 1,650 |
| Tensile, p.s.i. | 3,760 | 3,950 |
| Elongation, percent | 415 | 560 |
| $\Delta T$., °F | 43.4 | 52.8 |
| Resilience, percent | 70.7 | 66.5 |
| Shore A hardness | 65.0 | 61.0 |

[1] Physical mixture containing 65 percent of a complex diarylamine-ketone reaction product and 35 percent of N,N'-dipheny-p-phenylenediamine.
[2] N-cyclohexyl-2-benzothiazolesulfenamide.

The mercaptan-treated polymer had a considerably higher raw Mooney value than the base polymer but gave greater breakdown during processing. The mercaptan-treated polymer gave a higher state of cure than the base polymer and had a significantly lower heat buildup, higher modulus, and higher resilience.

We claim:

1. A method for modifying a rubbery polymer of a conjugated diene containing from 4 to 12 carbon atoms per molecule which comprises contacting said polymer, in solvent solution or a latex, with a tertiary dodecyl mercaptan under conditions to react from about 0.05 to about 0.75 percent of the double bonds in said polymer with said mercaptan, said mercaptan having been prepared by reacting triisobutylene with hydrogen sulfide.

2. The method of claim 1 wherein said rubbery polymer is selected from the group consisting of homopolymers of conjugated dienes and copolymers of conjugated dienes and monovinyl substituted aromatic compounds having at least 60 weight percent conjugated diene units present therein.

3. The method of claim 2 wherein said contacting is carried out at a temperature of from about 10 to about 150° C. for from about 1 hour to about 150 hours.

4. The method of claim 3 wherein said contacting is carried out in the presence of at least one promoter selected from the group consisting of diazothioethers, azo-bis-alkylnitriles, alkali metal persulfates, aralkylhydroperoxides, organic peroxides, combinations of potassium persulfate or a peroxide of potassium with reduced ferric phosphate, mixture of hydrogen peroxide and iron and mixture of an aralkylhydroperoxide and iron.

5. The method of claim 4 wherein said rubbery polymer is a homopolymer of 1,3-butadiene.

6. The method of claim 4 wherein said rubbery polymer is a copolymer of 1,3-butadiene and styrene.

7. The method of claim 5 wherein said promoter is azoisobutyronitrile.

8. The method of claim 6 wherein said promoter is potassium persulfate.

References Cited

UNITED STATES PATENTS 3,240,844   3/1966   Gruver _____ 260—94.7 XR
3,349,071   10/1967   Strobel _____ 260—94.7

JOSEPH L. SCHOFER, Primary Examiner

W. F. HAMROCK, Assistant Examiner

U.S. Cl. X.R.

260—92.1, 92.3, 94.7